US009610700B2

(12) United States Patent
Hittmann et al.

(10) Patent No.: US 9,610,700 B2
(45) Date of Patent: Apr. 4, 2017

(54) HAND-HELD POWER TOOL

(75) Inventors: Markus Hittmann, Weinstadt (DE); Ralf Schenk, Weinstadt (DE); Achim Rethaber, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 729 days.

(21) Appl. No.: 13/190,627

(22) Filed: Jul. 26, 2011

(65) Prior Publication Data
US 2012/0036722 A1 Feb. 16, 2012

(30) Foreign Application Priority Data
Aug. 11, 2010 (DE) .................. 10 2010 033 978

(51) Int. Cl.
*B27B 17/10* (2006.01)
*A01G 3/053* (2006.01)
*B27B 17/08* (2006.01)

(52) U.S. Cl.
CPC .............. *B27B 17/10* (2013.01); *A01G 3/053* (2013.01); *B27B 17/08* (2013.01)

(58) Field of Classification Search
CPC ......... B27B 17/00; B27B 17/08; B27B 17/10; A01G 3/00; A01G 3/04; A01G 3/047; A01G 3/0475; A01G 3/053
USPC ............. 30/381–387, 208–222; 83/830–834; 310/75 R, 83
See application file for complete search history.

(56) References Cited

U.S. PATENT DOCUMENTS

| 3,849,884 | A |   | 11/1974 | Arff |              |
|-----------|---|---|---------|------|--------------|
| 3,868,863 | A | * | 3/1975  | Gasner | .......................... 474/158 |
| 3,909,943 | A | * | 10/1975 | Buschman | ...................... 30/216 |
| 4,053,980 | A |   | 10/1977 | Poehlman |          |
| 4,281,457 | A | * | 8/1981  | Walton, II | ........................ 30/124 |
| 4,406,645 | A | * | 9/1983  | Dynie et al. | ................... 474/158 |
| 4,643,648 | A | * | 2/1987  | Huller | ................... B22F 3/1216 416/241 B |
| 4,679,960 | A | * | 7/1987  | Mizuhara | ............. B23B 31/006 228/154 |
| 4,722,630 | A | * | 2/1988  | Fang | ....................... F01D 5/025 228/138 |

(Continued)

FOREIGN PATENT DOCUMENTS

| CN | 1398209 A | 2/2003 |
| CN | 1532028 A | 9/2004 |

(Continued)

OTHER PUBLICATIONS

PDF-NPL_handheld power tool: product review on Aug. 3, 2008. www.amazon.com/InSinkErator-WRN-00-JamBuster-Wrenchette/dp/B000BQ7WE0/ref=sr_1_1?ie=UTF8&qid=1457028442&sr=8-1&keywords=garbage+disposal+allen+wrench.*

*Primary Examiner* — Jason Daniel Prone
*Assistant Examiner* — Richard Crosby, Jr.
(74) *Attorney, Agent, or Firm* — Gudrun E. Huckett

(57) ABSTRACT

In a hand-held power tool with a drive motor and a clutch connected to the drive motor and having an output part, the drive pinion is fixedly connected to the output part of the clutch so as to be driven by the drive motor for driving a tool. The drive pinion has a first individual part and a second individual part that are fixedly connected to each other. The first individual part has a toothing and the second individual part is connected to the output part of the clutch.

17 Claims, 2 Drawing Sheets

(56) References Cited

U.S. PATENT DOCUMENTS

| | | | | |
|---|---|---|---|---|
| 4,991,991 A * | 2/1991 | Ito | | C04B 37/005 403/272 |
| 5,028,162 A * | 7/1991 | Tsuno | | C04B 37/026 403/272 |
| 5,373,641 A * | 12/1994 | Ohkanda | | A01G 3/053 30/216 |
| 5,402,576 A * | 4/1995 | Kiyooka | | A01D 34/63 30/216 |
| 5,413,158 A * | 5/1995 | Wirth et al. | | 144/72 |
| 5,531,027 A * | 7/1996 | Martinez et al. | | 30/216 |
| 5,653,028 A * | 8/1997 | Hashimoto | | 30/123.4 |
| 5,771,583 A * | 6/1998 | Kremsler | | A01G 3/053 30/216 |
| 5,845,757 A * | 12/1998 | Csonka | | 192/105 BA |
| 5,947,866 A * | 9/1999 | Nagashima | | 477/200 |
| 6,170,159 B1 * | 1/2001 | Kramer et al. | | 30/216 |
| 6,206,028 B1 * | 3/2001 | Holden | | F16K 5/0647 137/271 |
| 6,254,349 B1 * | 7/2001 | Haugen | | F04D 29/266 415/216.1 |
| 6,352,539 B1 * | 3/2002 | Avellanet | | 606/113 |
| 6,354,006 B1 * | 3/2002 | Castelmani | | 30/123.4 |
| 6,418,893 B1 * | 7/2002 | Auchter | | F01L 1/3442 123/90.12 |
| 6,598,299 B2 * | 7/2003 | Stark | | A01G 3/053 30/216 |
| 6,918,450 B2 | 7/2005 | Lebisch et al. | | |
| 7,155,830 B2 * | 1/2007 | Sasaki | | A01G 3/053 30/208 |
| 7,258,205 B2 * | 8/2007 | Berti et al. | | 188/31 |
| 7,290,641 B2 * | 11/2007 | Lee | | 188/20 |
| 8,096,857 B2 | 1/2012 | Hofmann et al. | | |
| 9,157,483 B2 * | 10/2015 | Buurlage | | F16D 1/068 |
| 2002/0053140 A1 * | 5/2002 | Stark et al. | | 30/218 |
| 2005/0076510 A1 * | 4/2005 | Stones | | A01G 3/053 30/208 |
| 2006/0000097 A1 | 1/2006 | Kawamura et al. | | |
| 2006/0135267 A1 * | 6/2006 | Bosk | | 464/43 |
| 2008/0017419 A1 * | 1/2008 | Cooley et al. | | 175/286 |
| 2010/0154227 A1 * | 6/2010 | Heinzelmann | | 30/216 |

FOREIGN PATENT DOCUMENTS

| | | |
|---|---|---|
| CN | 100 358 678 C | 1/2008 |
| DE | 103 53 921 A1 | 6/2005 |
| DE | 102005047885 A1 | 4/2007 |
| EP | 1 343 604 B1 | 9/2003 |

* cited by examiner

HAND-HELD POWER TOOL

BACKGROUND OF THE INVENTION

The invention relates to a hand-held power tool comprising a drive motor that drives by means of a clutch a drive pinion for driving at least one tool. The drive pinion is fixedly connected to the output part of the clutch for common rotation.

DE 10 2005 047 885 A1 discloses a hand-held power tool, i.e., a chainsaw, provided with a drive sleeve secured on a centrifugal clutch. The drive sleeve has an outer toothing. The toothing has on its end that is facing the clutch drum an area that is milled because of the cutter shape of the milling tool that was used to mill the toothing. This cutter-shape-caused milled area enlarges the axial size of the power tool.

It is therefore an object of the present invention to provide a hand-held power tool of the aforementioned kind that has a reduced size.

SUMMARY OF THE INVENTION

In accordance with the present invention, this is achieved in that the drive pinion is constructed of at least two individual parts that are fixedly connected to each other wherein a first individual part is provided with a toothing and wherein a second individual part is connected to the clutch.

By a two-part embodiment of the drive pinion, the milling area that is required in case of a single-part drive pinion can be eliminated so that the axial size of the drive pinion and thus the entire size of the power tool can be reduced. Since the size, and in particular the axial size or length, is critical in case of hand-held power tools and should be as small as possible, a size reduction even within the millimeter range provides significant advantages. The reduced length of the drive pinion also effects a reduction of the bending forces acting on the drive pinion and the connecting location at the clutch drum. The two-part configuration of the drive pinion that can be easily realized provides significant advantages.

Advantageously, the first individual part has a section that has a largest diameter of the first individual part wherein the functional area of the toothing extends across the entire section with the largest diameter. In this way, the toothing can be produced by a simple milling procedure of the entire largest diameter section. The functional area of the toothing is the area where the toothing has its full depth. Areas in which the entire tooth height of the toothing is not reached, for example, the milled area caused by the shape of the milling tool, are not part of the functional area of the toothing.

Advantageously, on the second individual part a bearing seat for a bearing of the drive pinion is formed. In this connection, the outer diameter of the second individual part at the bearing seat corresponds in particular at least to the largest diameter of the first individual part. As a result of the large size configuration of the bearing seat a stable overall configuration is achieved. By configuring the drive pinion to have two individual parts, it is possible to design the largest diameter of the drive pinion and the outer diameter of the bearing seat to be approximately of the same size or to design the bearing seat to be larger, without the overall size being enlarged as a result of an additionally required cutter-shape-caused milled area.

A simple and permanently fast connection between the two individual parts results when the first and the second individual parts are soldered to each other. Advantageously, the soldered connection is realized by means of a ring of soldering material that is inserted between the two individual parts. For this purpose, it is provided that between the first and the second individual parts a closed receptacle for the ring of soldering material is formed. The ring of soldering material can be inserted into the receptacle during manufacture and, subsequently, with appropriate heating, can be melted so that the two individual parts are soldered to each other by a soldered connection. In order to secure the position of the individual parts relative to each other during manufacture and to reduce load acting on the soldering location in operation, it is provided that the first individual part has a pin that projects into a recess provided in the second individual part.

Advantageously, the drive pinion has an engagement element for a tool at the side that is facing away from the clutch. The engagement element is in particular an internal hexagon opening so that by means of a hexagon tool a defined load on the motor can be introduced at the drive pinion. In this way, during production or during servicing a defined adjustment of the motor can be realized. In operation, the internal hexagon opening can be closed by a rubber plug, for example. A simple manufacture results when the internal hexagon opening is a section of a through opening in the first individual part.

Advantageously, the clutch is a centrifugal clutch and the output part of the clutch is a clutch drum. In order to achieve a positive locking securing of the drive pinion on the clutch drum, it is provided that the second individual part has a pin that projects into an opening of the clutch drum. The drive pinion is advantageously connected by material bonding to the clutch drum, i.e., by soldering or the like. Advantageously, the power tool has an eccentric gear whose gear wheel engages the drive pinion. The drive pinion thus provides a direct connection between the clutch drum and the eccentric gear. The power tool is in particular a hedge trimmer with at least one blade and the drive motor is advantageously an internal combustion engine.

DESCRIPTION OF THE PREFERRED EMBODIMENTS

Figure 1:
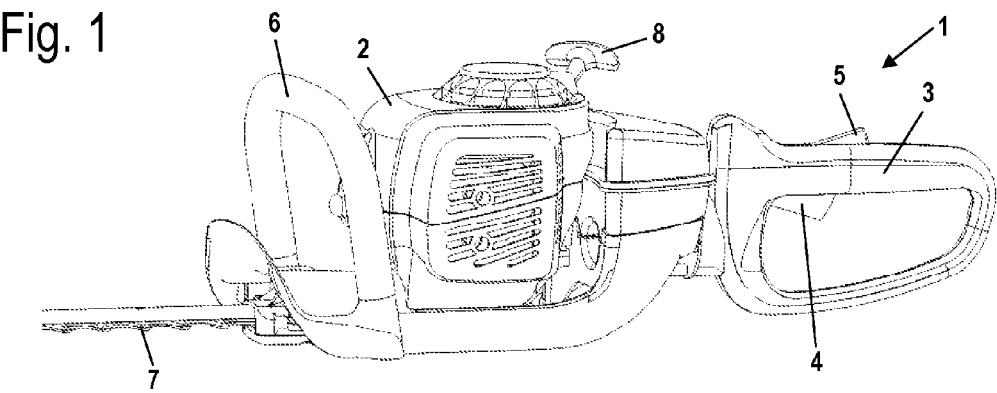
FIG. 1 is a perspective illustration of a hedge trimmer.

FIG. 1 shows an embodiment of a hand-held power tool in the form of a hedge trimmer 1. The proposed configuration of a drive pinion can advantageously be used also in connection with other power tools such as motor chainsaws, cut-off machines, trimmers or the like. An especially advantageous configuration results when used in connection with a hedge trimmer 1.

The hedge trimmer 1 has a housing 2 having a rear handle 3. On the rear handle 3 a throttle lever 4 for operation of a drive motor arranged in the housing 2 as well as a throttle lock 5 are pivotably supported. A starter grip 8 for operating a starter of the drive motor projects from the housing 2. On the side of the housing 2 that is facing away from the handle 3 two blades 7 project forwardly and are driven in opposite directions. On the side of the housing 2 that is facing the blades 7 a grip 6 for guiding the hedge trimmer 1 is arranged.

Figure 3:
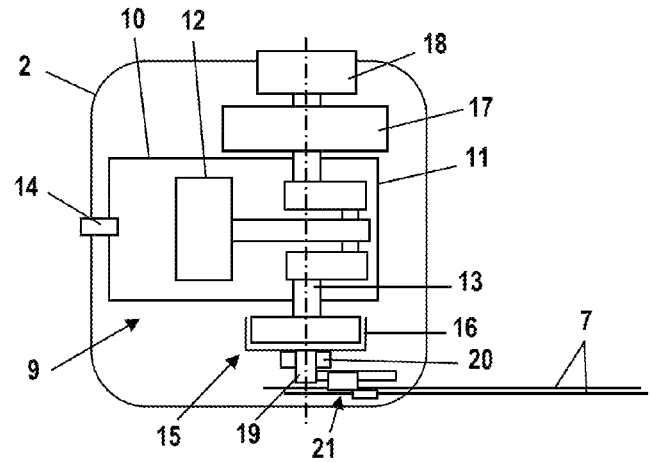
FIG. 3 is a schematic illustration of the drive of the hedge trimmer.

The configuration of the drive of the hedge trimmer 1 is shown schematically in FIG. 3. The starter grip 8 (FIG. 1) is a component of a starter device 18 for starting the drive motor 9 that is embodied as an internal combustion engine, in particular as a two-stroke engine or as a four-stroke engine with fuel lubrication. The drive motor 9 has a cylinder 10 in which a piston 12 is supported reciprocatingly. In the cylinder 10 a combustion chamber is formed that is delimited by the piston 12. A spark plug 14 projects into the combustion chamber. The piston 12 drives a crankshaft 13 in rotation that is rotatably supported in crankcase 11. A fan wheel 17 is arranged fixedly on the crankshaft 13 for common rotation and is engaged by the starter device 18. On the opposite end of the crankcase 11 a clutch 15 is arranged that is embodied as a centrifugal clutch. The clutch 15 has a clutch drum 16 on which a drive pinion 19 is secured. The drive pinion 19 is rotatably supported by means of a bearing 20 that is embodied as a roller bearing. The drive pinion 19 drives an eccentric gear 21 that, in turn, operates the blades 7 in opposite directions in a reciprocating fashion.

Figure 2:
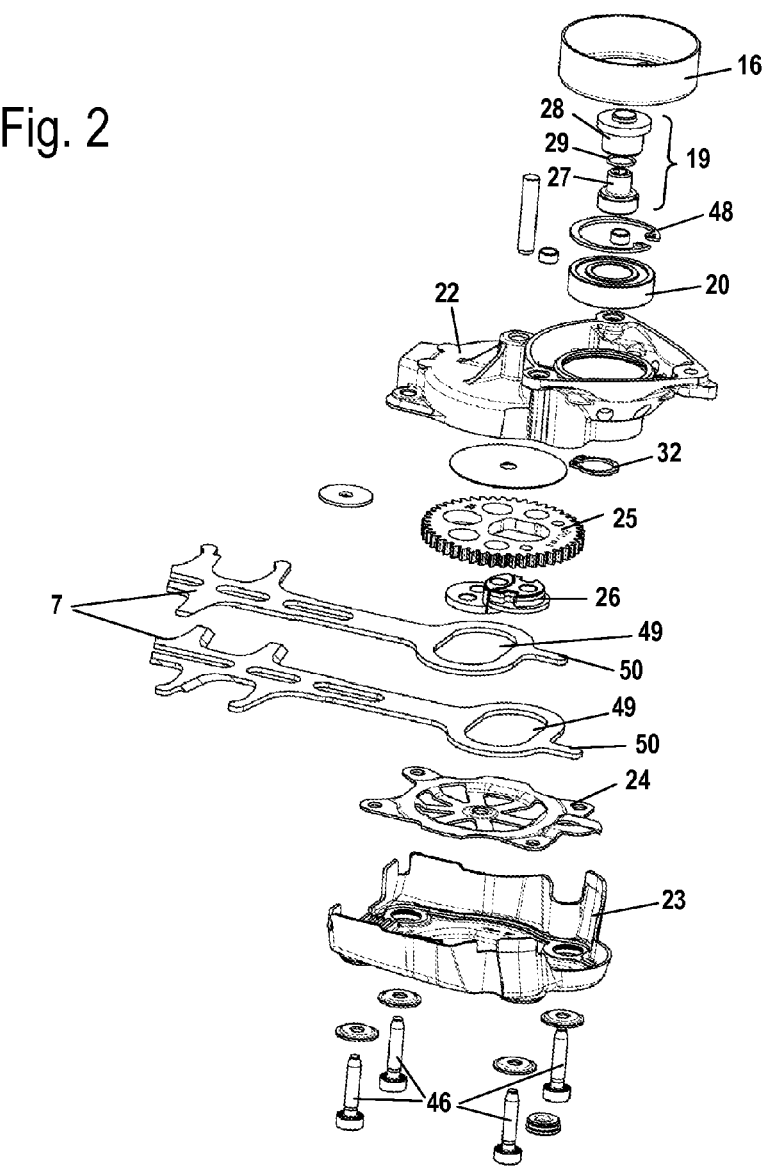
FIG. 2 is an exploded view of the hedge trimmer gear unit.

FIG. 2 shows the configuration of the drive of the hedge trimmer 1 in detail. As shown in FIG. 2, the drive pinion 19 has a first individual part 27 and a second individual part 28 that is secured on the clutch drum 16. Upon manufacture of the drive pinion 19, between the two individual parts 27 and 28 a ring 29 of soldering material is inserted that connects the two individual parts 27 and 28 fixedly to each other by a material bonding connection. The hedge trimmer 1 has a gear housing shell 22 that is closed off downwardly at the side that is facing away from the drive motor 9 with a housing cover 23. The gear housing cover 23 is secured by four fastening screws 46 to the gear housing shell 22. Adjacent to the bearing 20 there is a detention ring 32 that secures the inner ring of the bearing 20 in its position. A further detention ring 48 secures the position of the external ring of bearing 20 relative to the gear housing shell 22. The drive pinion 19 drives a gear wheel 25 that is engaged by an eccentric cam 26. The gear wheel 25 forms together with the eccentric cam 26 the eccentric gear 21 (FIG. 3). The eccentric cam 26 engages openings 49 of the blades 7. Between the gear housing cover 23 and the lower blade 7 there is a support plate 24 on which the blades 7 are supported with noses 50.

Figure 4:
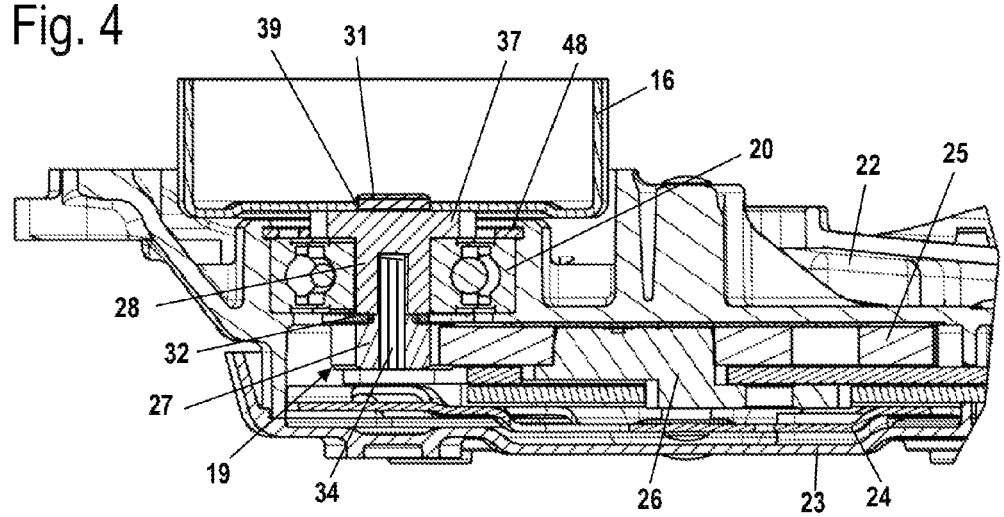
FIG. 4 is a section of the gear unit of the hedge trimmer.

As illustrated in the section illustration of FIG. 4, the clutch drum 16 has an opening 39 into which the pin 31 of the second individual part 28 of the drive pinion 19 projects. A collar 37 of the second individual part 28 is positioned on the exterior side of the clutch drum 16 and is supported thereat. By means of the collar 37 the drive pinion 19 is fixedly connected to the clutch drum 16, for example, it is soldered or welded thereto. FIG. 4 shows also the position of the detention rings 32 and 48 on the roller bearing 20.

Figure 5:
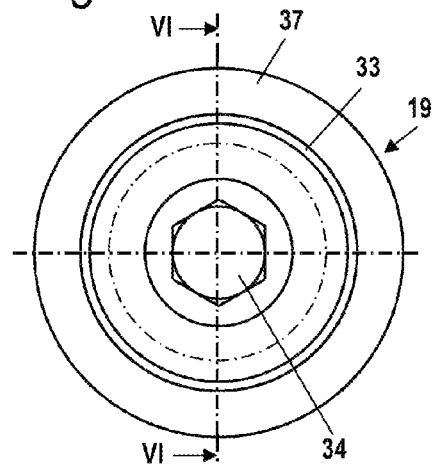
FIG. 5 is an end view of the drive pinion.
Figure 6:
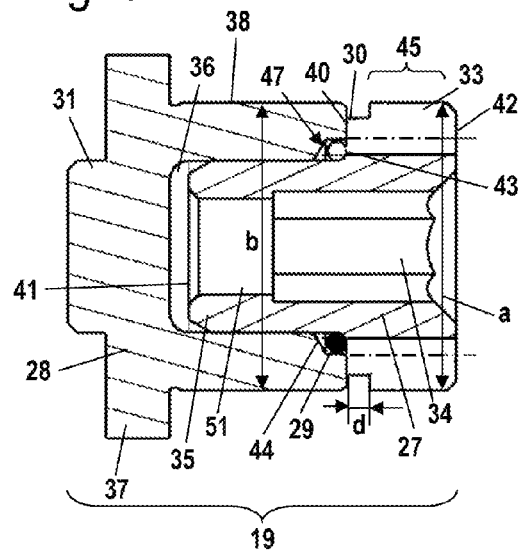
FIG. 6 is a section along the section line VI-VI of FIG. 5.

FIGS. 5 to 6 illustrate the drive pinion 19 in different views. FIG. 6 shows a through opening 51 that extends in the first individual part 27 from the first end face 41 of individual part 27, facing the clutch drum 16 and the second individual part 28, up to the second end face 42 that is facing away from the clutch drum 16. The through opening 51 is provided with an internal hexagon opening 34 that, beginning at the second end face 42, extends across approximately two thirds of the through opening 51. The transition of the internal hexagon opening 34 into the second end face 42 is beveled. By means of the internal hexagon opening 34 a defined torque can be applied to the drive pinion 19 with the aid of a hexagon tool; this torque counteracts the drive torque of the drive motor 9. In this way, a defined adjustment of the drive motor 9 at the time of manufacture and during servicing is possible.

As shown in FIG. 6, the second individual part 28 has a recess 36 into which a pin 35 of the first individual part 27 projects. In the illustrated embodiment the pin 35 has a circular outer cross-section and the recess 36 has a circular inner cross-section. However, other cross-sectional shapes that produce a fixed (anti-rotation) connection between the two individual parts 27 and 28 can also be advantageous. The second individual part 28 has a collar 37. Adjacent to the collar 37 on the outer circumference of the second individual part 28 a bearing seat 38 is formed on which the inner ring of the bearing 20 is arranged. The bearing seat 38 has an outer diameter b.

Between the first individual part 27 and the second individual part 28 there is a groove 30 into which the detention ring 32 projects. The groove 30 has a width d that is only slightly greater than the width of the detention ring 32. The first individual part 27 has a largest diameter a that extends across a section 45 of the first individual part 27. On the outer circumference in the section 45 a toothing 33 is provided that interacts with the gear wheel 25. The functional area of the toothing 33 extends across the entire section 45. In this context, the functional area of the toothing 33 is provided in the area in which the toothing has its full depth and tooth height. Adjacent to the second end face 42 the toothing 33 is beveled. In the area of the bevel the full tooth height is not provided so that the area of the bevel is not considered to belong to the section 45. The area of the groove 30 also does not form part of the functional area of the toothing 33 because here also the full tooth height is not provided. The outer diameter a in the section 45 corresponds at most to the outer diameter b of bearing seat 38. The outer diameter b of the bearing seat 38 is thus greater or approximately of the same size as the outer diameter a of the section 45. As a result of the two-part configuration of the drive pinion 19, despite the given size conditions, there is no need for a cutter-shape-caused milled area that is caused by the milling tool between the functional area of the toothing 33 and the bearing seat 38. In the area of the toothing 33 on the side that is facing the second individual part 28 only the groove 30 for the detention ring 32 is provided. In another configuration of the axial securing action, the functional area of the toothing 33 can also extend up to the end face 40 of the second individual part 28.

The toothing 33 extends at reduced height across the area of the groove 30 up to a shoulder 43 where the diameter of the first individual part 27 is greatly reduced and passes into the pin 35. The shoulder 43 is positioned at the end face 40 of the second individual part 28 that is facing the first individual part 27. The recess 36 into which the pin 35 projects extends from the end face 40 in axial direction into the interior of the second individual part 28. At the transition of the end face 40 into the recess 36 a circumferentially extending annular recess 44 is formed that delimits together with the shoulder 43 a receptacle 47. The receptacle 47 is designed to be completely dosed. In the receptacle 47 the ring 29 of soldering material is arranged that connects the two individual parts 27 and 28 to each other after soldering, i.e., after the soldering material of the ring 29 has been made liquid. The ring 29 of soldering material in FIG. 6 is shown prior to soldering. The ring 29 of soldering material is embodied as slotted or split ring.

It can also be provided that the section 45 with the largest diameter a of the first individual part extends up to the end face 40 of the second individual part 28.

The specification incorporates by reference the entire disclosure of German priority document 10 2010 033 978.4 having a filing date of Aug. 11, 2010.

While specific embodiments of the invention have been shown and described in detail to illustrate the inventive principles, it will be understood that the invention may be embodied otherwise without departing from such principles.

What is claimed is:

1. A hand-held power tool comprising:
   a drive motor;
   a clutch connected to said drive motor and comprising a clutch drum;
   a drive pinion driven by said drive motor to drive a tool, said drive pinion comprised of a first individual part and a second individual part, wherein said second individual part is soldered or welded to said clutch drum, and wherein said first individual part and said second individual part are soldered to each other, wherein said second individual part comprises an end face that is facing said first individual part;
   a bearing;
   said drive pinion rotatably supported in said bearing, wherein said second individual part comprises an outer circumference forming a bearing seat, wherein said bearing is arranged on said bearing seat;
   wherein said first individual part comprises a toothing that is arranged on an outer circumference of said first individual part, wherein said toothing extends to and adjoins said end face of said second individual part;
   wherein said first individual part has a section provided with the largest diameter of said first individual part;
   wherein said second individual part has an outer diameter at said bearing seat, wherein said outer diameter of said second individual part at said bearing seat is greater than said largest diameter of said first individual part or is identical to said largest diameter of said first individual part.

2. The power tool according to claim 1, wherein said first individual part comprises a section that has the largest diameter of said first individual part and wherein a functional area of said toothing extends across an entire length of said section with said largest diameter.

3. The power tool according to claim 1, wherein between said first individual part and said second individual part a closed receptacle for a ring of soldering material is formed.

4. The power tool according to claim 3, wherein said first individual part has a shoulder and said second individual part has an annular recess, wherein said shoulder and said recess delimit said receptacle.

5. The power tool according to claim 1, wherein said drive pinion has an engagement element for the tool and said engagement element is arranged on a side of said drive pinion that is facing away from said clutch.

6. The power tool according to claim 5, wherein said engagement element is an internal hexagon opening.

7. The power tool according to claim 6, wherein said internal hexagon opening is a section of a through opening provided in said first individual part.

8. The power tool according to claim 1, wherein said clutch is a centrifugal clutch.

9. The power tool according to claim 1, wherein said second individual part of said drive pinion has a pin that projects into an opening of said clutch drum.

10. The power tool according to claim 1, further comprising an eccentric drive having a gear wheel that engages said drive pinion.

11. The power tool according to claim 1 in the form of a hedge trimmer with at least one blade.

12. The power tool according to claim 1, wherein said drive motor is an internal combustion engine.

13. The power tool according to claim 1, wherein said bearing is a roller bearing.

14. The power tool according to claim 13, further comprising a detention ring, wherein between said bearing seat and said toothing a groove is provided, wherein said detention ring is arranged in said groove and secures an inner ring of said bearing.

15. The power tool according to claim 1, wherein said first individual part comprises an end face that is facing away from said second individual part, wherein said first individual part comprises a shoulder, wherein a diameter of said first individual part is reduced at said shoulder, wherein said second individual part is resting on said shoulder, and wherein said toothing extends all the way from said end face of said first individual part to said shoulder.

16. A hedge trimmer comprising:
    at least one hedge trimmer blade;
    a drive motor;
    a clutch connected to said drive motor and comprising an output part;
    a drive pinion comprised at least of a first individual part and a second individual part, wherein said first and second individual parts are soldered to each other, wherein said second individual part is fixedly connected to said output part, and wherein said first individual part comprises a toothing;
    a bearing supporting said drive pinion at one end of said drive pinion, wherein said bearing is positioned, viewed in an axial direction of said drive pinion, between said output part of said clutch and an area of said first individual part provided with said toothing;
    wherein said motor drives through said clutch said drive pinion that drives via an eccentric gear said at least one hedge trimmer blade;
    wherein said first individual part comprises a pin and said second individual part comprises a pin-receiving recess, wherein said pin projects into said pin-receiving recess of said second individual part, wherein between said first and second individual parts a receptacle is formed and accommodates soldering material, wherein said receptacle is closed off by said pin inserted into said pin-receiving recess.

17. The hedge trimmer according to claim 16, wherein said second individual part comprises an end face and further comprises an annular recess at a transition from said end face into said pin-receiving recess, wherein said annular recess delimits said receptacle.

* * * * *